(12) United States Patent
Shimanaka

(10) Patent No.: US 6,754,267 B1
(45) Date of Patent: Jun. 22, 2004

(54) IMAGE PROCESSING APPARATUS

(75) Inventor: Masaya Shimanaka, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/347,456

(22) Filed: Jul. 6, 1999

(30) Foreign Application Priority Data

Jul. 8, 1998 (JP) .......................................... 10/192780
Mar. 16, 1999 (JP) .......................................... 11/071082

(51) Int. Cl.$^7$ .................... H04N 7/12; H04N 11/02; H04N 11/04
(52) U.S. Cl. .................... 375/240.03; 375/245
(58) Field of Search .................... 375/245, 240.06, 375/240.08, 240.01, 240.11, 240.12, 240.03; 358/473; 348/14.01; 382/236, 239; 709/247

(56) References Cited

U.S. PATENT DOCUMENTS

| | | | | |
|---|---|---|---|---|
| 5,220,440 A | * | 6/1993 | Hisatake | 382/239 |
| 5,968,132 A | * | 10/1999 | Tokunaga et al. | 709/247 |
| 6,252,991 B1 | * | 6/2001 | Uchio et al. | 382/236 |
| 6,307,974 B1 | * | 10/2001 | Tsujimoto | 382/239 |

FOREIGN PATENT DOCUMENTS

| | | | |
|---|---|---|---|
| JP | 05-260064 | * | 10/1993 |
| JP | 06-054200 | * | 2/1994 |
| JP | 06-069811 | * | 3/1994 |
| JP | 09-037285 | | 2/1997 |
| JP | 10-136338 | * | 5/1998 |

OTHER PUBLICATIONS

Japanese Office Action Dated Dec. 24, 2002 with partial translation.*

* cited by examiner

Primary Examiner—Stephen Chin
Assistant Examiner—Curtis Odom
(74) Attorney, Agent, or Firm—McGinn & Gibb, PLLC

(57) ABSTRACT

An image processing apparatus includes a converter, a quantizer, a transfer speed recognizer, a transfer data converter and an interface. The converter reads an image of a subject to convert it into an electric signal before outputting it. The quantizer outputs a quantized electric signal as an image signal while quantizing the electric signal output from the converter. The transfer speed recognizer detects a transfer speed of the image signal output to an external part. The transfer data quantity converter converts a data quantity of the quantized image signal from the quantizer in accordance with the transfer speed detected by ther transfer speed recognizer. The interface outputs the image signal outputted from the transfer data quantity converter.

26 Claims, 14 Drawing Sheets

F I G. 2
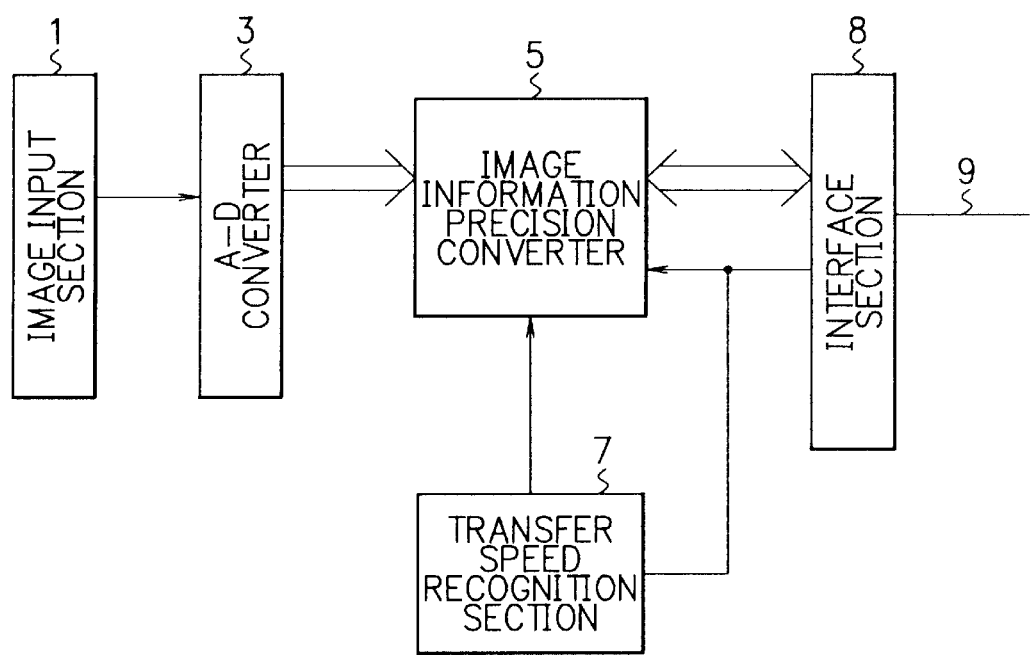

IMAGE PROCESSING APPARATUS

BACKGROUND OF THE INVENTION

The present invention relates to an image processing apparatus which outputs pictures photographed as a digital moving image data. More to particularly, this invention relates to an image processing apparatus which is connected to an information processing apparatus such as a personal computer and so forth to be used.

1. Description of the Prior Art

There is a system in which a moving image can be handled in a television conference system using the information processing apparatus such as the personal computer and so forth. In such the system, a picture photographed by the camera is transferred to the information processing apparatus as, for instance, an image data in every frame unit. The information processing apparatus executes data compression processing to the image data to transfer the data to the distant place through LAN or communication channel. There is also a system for regenerating a picture which is photographed, by only a personal computer and so forth exception for the television conference system for transmitting-receiving an image data photographed through the image processing apparatus. In order to constitute such the system, it is necessary to transfer the photographed image to the information processing apparatus as a moving image data.

When the image data outputted from the image processing apparatus such as the camera and so forth is a digital data, such the digital image data, in many cases, is transferred to the personal computer and so forth by a universal interface. FIG. 1 is a system configuration view showing a system using USB (Universal Serial Bus) interface as a universal interface. The personal computer 10 is provided with two USB ports. In this example, a key board 11 is connected to one USB port. Further, several terminal equipments 20, 30, . . . 40 are connected to the USB through a USB hub 15 to which the other USB port is connected.

Here, supposing that the terminal equipment 20 is the camera as an image processing apparatus outputting a photographed image as a digital image data. When only the terminal equipment 20 is operated, the digital image data is transferred from the terminal equipment 20 to the personal computer 10 with stable frame rate because the terminal equipment 20 is capable of occupying the USB. However, when another terminal equipments 30, 40 are operating and the data is also transferred from another terminal equipments 30, 40 to the personal computer 10, transfer data from the terminal equipment 20 is transferred to the USB with time division operation. In such the case, a frame rate of the digital image data transferred from the terminal equipment 20 to the personal computer 10 deteriorates.

There is the problem that the conventional image processing apparatus is connected to the personal computer 10 as above method, therefore when the digital camera is used, another terminal equipments 30, 40 are incapable of being used synchronously. If the digital camera together with the terminal equipments 30, 40 are used synchronously, the frame rate of the image data from the digital camera deteriorates, thus frame omission occurs in the moving image data received by the personal computer 10.

SUMMARY OF THE INVENTION

In view of the foregoing, it is an object of the present invention, in order to overcome the above-mentioned problems, to provide an image processing apparatus which is capable of transferring image data with stable frame rate, and which causes no frame omission of moving image to occur, even though the apparatus causes another equipment to be operated synchronously on interface bus.

According to a first aspect of the present invention, in order to achieve the above mentioned object, there is provided an image processing apparatus which comprises a converting means reading an image of a subject to convert into an electric signal before outputting it, a quantizing means for outputting a quantized electric signal as an image signal while quantizing the electric signal outputted from the converting means, a transfer speed recognition means for detecting a transfer speed of the image signal outputted to an external part, a transfer data quantity converting means for converting data quantity of quantized the image signal from the quantizing means in accordance with the transfer speed detected by the transfer speed recognition means, and an interface means for outputting the image signal outputted from the transfer data quantity converting means.

According to a second aspect of the present invention, in the first aspect, there is provided an image processing apparatus, wherein the transfer speed recognition means detects the transfer speed of the image signal according to cycle of a transfer demand signal transmitted from a host apparatus which receives the image signal.

According to a third aspect of the present invention, in the second aspect, there is provided an image processing apparatus, wherein the transfer data quantity converting means is a quantization precision converting means for converting quantization precision of the quantized image signal from the quantization means, and the quantization precision conversion means, when the transfer speed recognition means detects that the cycle of the transfer demand signal is less than reference value, increasing quantization precision, while when the transfer speed recognition means detects that the cycle of the transfer demand signal exceeds the reference value, decreasing the quantization precision.

According to a fourth aspect of the present invention, in the third aspect, there is provided an image processing apparatus, wherein the quantization precision converting means outputs directly quantized image signal to the interface means in case where the cycle of the transfer demand signal is less than the minimum reference value of a plurality of reference values, while when the cycle of the transfer demand signal exceeds one reference value and the cycle is less than the other reference value, the quantization precision converting means reduces bit number of the quantized image signal in accordance with the other reference value to output to the interface means.

According to a fifth aspect of the present invention, in the fourth aspect, there is provided an image processing apparatus, wherein the quantization precision conversion means enables the bit number of the image signal which is changed in accordance with respective reference values to be altered.

According to a sixth aspect of the present invention, in the second aspect, there is provided an image processing apparatus, wherein the transfer data quantity conversion means is an information quantity conversion means for converting information quantity of the quantized image signal from the quantization means, and the information quantity conversion means, when the transfer speed recognition means detects that the cycle of the transfer demand signal is less than the reference value, increases information quantity, while when the transfer speed recognition means detects that the cycle of the transfer demand signal exceeds the reference value, the information quantity conversion means decreases information quantity.

According to a seventh aspect of the present invention, in the sixth aspect, there is provided an image processing apparatus, wherein the information quantity conversion means outputs directly a quantized image signal to the interface means in case where the cycle of the transfer demand signal is less than the minimum reference value of a plurality of reference values, while when the cycle of the transfer demand signal exceeds one reference value and the cycle is less than the other reference value, the information conversion means reduces the information quantity of the image signal in accordance with the other reference value to output to the interface means.

According to an eighth aspect of the present invention, in the sixth aspect or the seventh aspect, there is provided an image processing apparatus, wherein the information quantity conversion means is constituted such that it is capable of being changed the information quantity of the image signal changed in accordance with respective reference values.

According to a ninth aspect of the present invention, in any of the third, the fourth, sixth, or seventh aspects, there is provided an image processing apparatus, the transfer speed recognition means is constituted such that the reference value thereof is capable of being changed.

According to a tenth aspect of the present invention, in any of the first to the ninth aspects, there is provided an image processing apparatus, wherein the interface means is connected to USB.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 2 is a block diagram showing a configuration of a first embodiment of an image processing apparatus according to the present invention;

FIG. 10(A) shows example of cycle of 250 ms, FIG. 10(B) shows example of cycle of 563 ms, and FIG. 10(C) shows example of cycle of 1000 ms;

DETAILED DESCRIPTION OF THE PREFERRED EMBODIMENTS

Figure 1:
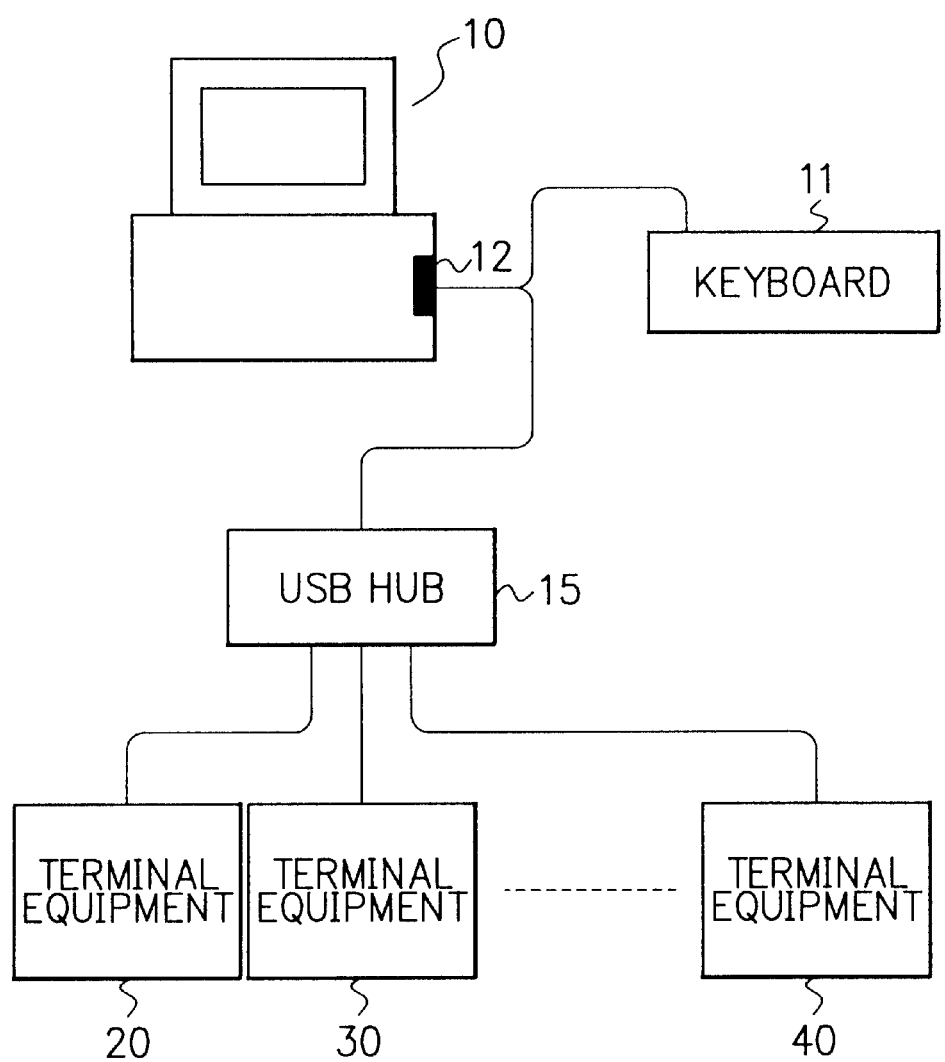
FIG. 1 is a system configuration view showing a general system using USB interface.

A preferred embodiment of the present invention will be described in detail in accordance with the accompanying drawings.

FIG. 2 is a block diagram showing a configuration of a first embodiment of an image processing apparatus according to the present invention. In FIG. 2, an image input section (conversion means) 1 converts an image photographed by CCD sensor and so forth into an electric signal to output an analog image data to A-D converter (quantization means) 3. The A-D converter 3 quantizes analog image data to output digital image data to an image information precision converter 5. In this example, the A-D converter 3 converts 1 (one) pixel into digital data of 8 bits.

The image information precision converter (transfer data quantity converter, quantization precision converter) 5 converts data of 8 bits into data of "f"(f≦8) in accordance with the precision information from the transfer speed recognition section (transfer speed recognition means) 7. Namely, the image information precision converter 5 implements conversion of quantization of precision. The digital image data after quantization precision conversion is outputted to an interface section (interface means) 8. The interface section 8 outputs the digital image data after quantization precision conversion to the USB 9 synchronized with an image transfer signal outputted from the personal computer (not illustrated) as being one example of host apparatus.

Here, a transfer speed recognition section 7 counts a cycle of the frame transfer demand signal transmitted from the personal computer through the USB 9 to recognize practical transfer speed of the digital image data in the USB9. And then the transfer speed recognition section 7 outputs the precision information corresponding to recognized transfer speed to the image information precision converter 5.

Next, there will be described operation referring to flowchart of FIG. 3.

When the image processing apparatus is started, the image input section 1 commences photographing of a subject (STEP S1). The analog image data from the image input section 1 undergoes sampling with prescribed sampling rate in the A-D converter 3 to be converted into the digital image data of 1 (one) pixel of 8 bits. Then, the digital image data is inputted to the image information precision converter 5 in order.

The personal computer outputs the frame transfer demand signal for demanding frame data output from the image processing apparatus intermittently to the USB 9. The cycle of the frame transfer demand signal is an interval of the demand signal of the image data from the personal computer. When other equipment, except for the image processing apparatus, do not operate, an output interval of the frame transfer demand signal is short, because the USB can be occupied for the sake of the transfer of the image data from the image processing apparatus, and the personal computer does not implement another processing except for the image processing. To the contrary, when other equipment operates, the output interval of the frame transfer demand signal is long, because the personal computer should take in to be processed the data from the other equipment through the USB 9.

The transfer speed recognition section 7 counts, when the frame demand signal is outputted from the personal computer, differences between the time on that occasion and the time when the frame transfer demand signal is outputted just before to count the cycle of the frame transfer demand signal. The transfer speed recognition section 7 recognizes transfer speed of the image data from the counting result. Then, the apparatus provides the precision information in accordance with the transfer speed recognized previously for the image information precision converter 5.

The short cycle of the frame transfer demand signal is to mean that transfer processing of the image data of previous frame ends early, therefore, in this embodiment, bit number in every 1 (one) pixel is set comparatively large. On the other hand, the long cycle of the frame transfer demand signal is to mean that transfer processing of the image data of previous frame takes a lot of time, therefore, the bit number in every 1 (one) pixel is set comparatively small. The frame rate does not become low, even through practical data transfer speed is low, by setting the bit number in every 1 (one) pixel comparatively small.

In this embodiment, as a reference value for changing precision information according to the cycle of the frame transfer demand signal, namely data transfer speed, the cycle 250 ms and the cycle 333 ms of the frame transfer demand signal are used. Namely, when the cycle of the frame transfer demand signal is less than 250 ms (STEP S2), the transfer speed recognition section 7 provides the precision information directing that the transfer speed recognition section 7 renders the quantization precision to be 8 bits to the image information precision converter 5 (STEP S3).

When the cycle of the frame transfer demand signal exceeds 250 ms, if the cycle of the frame transfer demand signal is less than 333 ms (STEP S4), the transfer speed recognition section 7 provides the precision information directing that the transfer speed recognition section renders the quantization precision to be 6 bits to the image information precision converter 5 (STEP S5).

When the cycle of the frame transfer demand signal exceeds 333 ms, the transfer speed recognition section 7 provides the precision information directing that the transfer speed recognition section renders the quantization precision to be 4 bits to the image information precision converter 5 (STEP S6).

The image information precision converter 5 converts the bit number of respective pixels in the newly inputted image data of the frame into f bits in accordance with the precision information to output to the interface section 8 (STEP S7). Hereinafter, the image data outputted to the interface section 8 is represented as a conversion image information. Further, in this embodiment f is set as being "f"=8, 6, or 4.

In the case of "f"=8, the image information precision converter 5 directly outputs the inputted digital image data as it is to the interface section 8. In the case of "f"=6, or "f"=4, for instance, the image information precision converter 5 converts data of 8 bits into data of 6 bits or data of 4 bits while shifting data of 8 bits to 2 bits or 4 bits in the subordinate side to output the conversion image information to the interface section 8. Furthermore, as a method of conversion, it is suitable to use another algorithm except for bit-shift.

Subsequently, the processing of STEP S7 is repeated (STEP S8) until transfer of the image data of 1 (one) frame is terminated, when the transfer of the image data of 1 (one) frame is terminated, the processing after STEP S2 is implemented again in connection with the next frame (STEP S9). Moreover, a termination of the image information transfer, for instance, is to transmit a termination signal from the personal computer.

Figure 4:
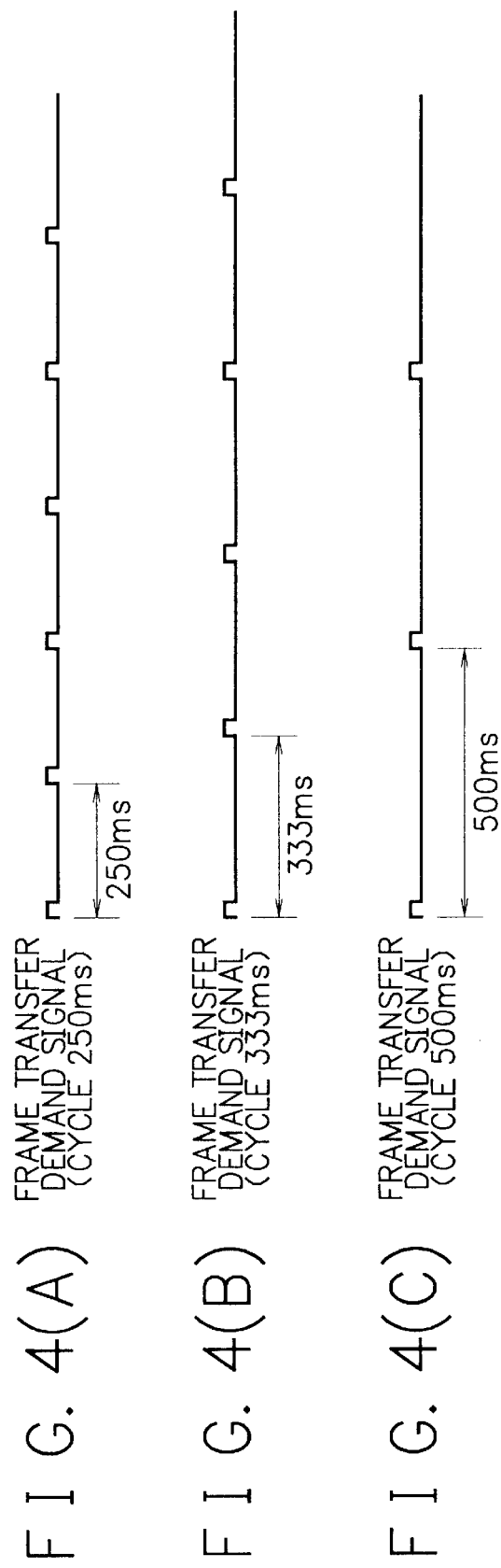
FIGS. 4(A), to 4(C) are timing chart showing an example of cycle of frame transfer demand signal.
Figure 5:
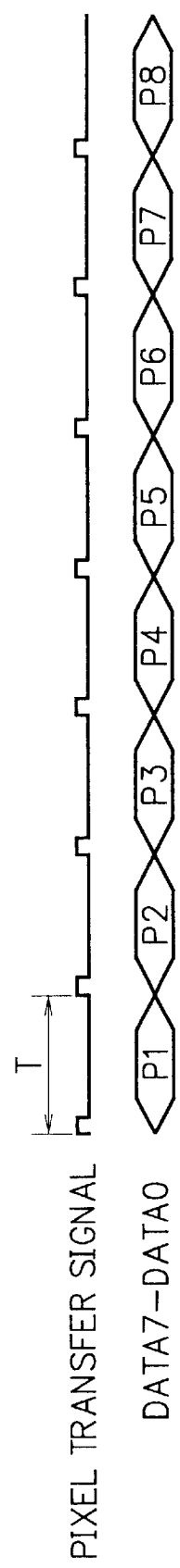
FIG. 5 is a timing chart showing condition of output of a conversion image information in the case where a precision information directing that quantization precision is set to 8 bits.
Figure 6:
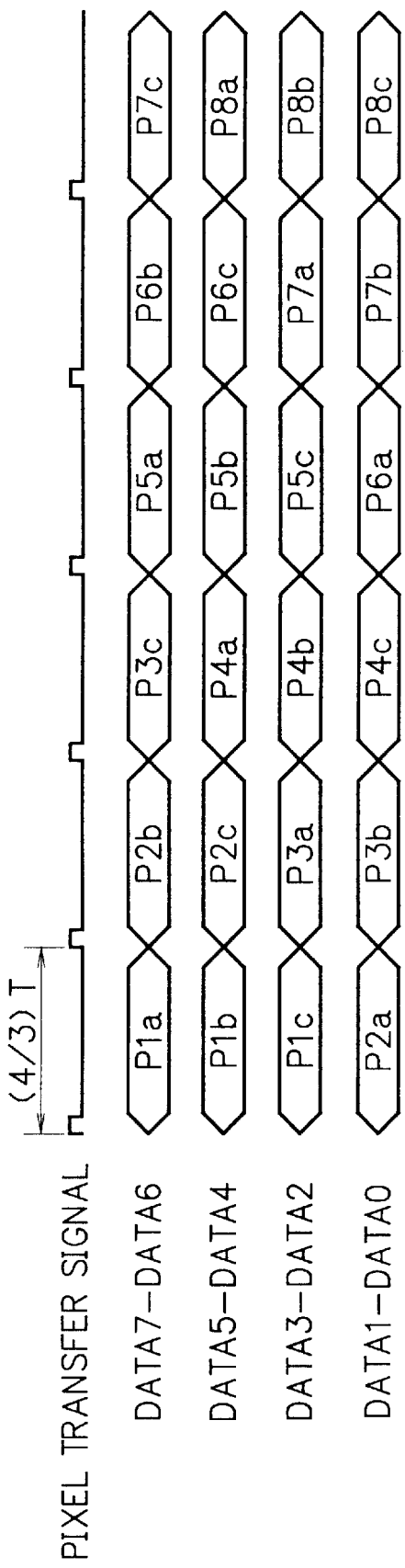
FIG. 6 is a timing chart showing condition of output of a conversion image information in the case where a precision information directing that quantization precision is set to 6 bits.
Figure 7:
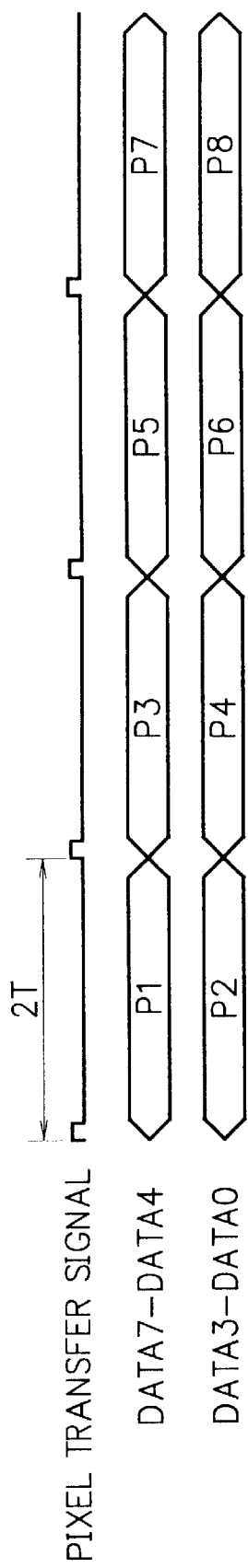
FIG. 7 is a timing chart showing condition of output of a conversion image information in the case where a precision information directing that quantization precision is set to 4 bits.

Next, there will be described operation example referring to timing charts of FIGS. 4(A) to 4(C), to 7. FIGS. 4(A) to 4(C) denote example of the cycle of the frame transfer demand signal. FIG. 4(A) is an example of cycle 250 ms, FIG. 4(B) is an example of cycle 333 ms, and FIG. 4(C) is an example of cycle 500 ms. FIG. 5 is a timing chart showing a condition of an output of the conversion image information in the case where the precision information directing that it renders quantization precision to be 8 bits. FIG. 6 is a timing chart showing a condition of an output of the conversion image information in the case where the precision information directing that it renders quantization precision to be 6 bits. FIG. 7 is a timing chart showing a condition of an output of the conversion image information in the case where the precision information directing that it renders quantization precision to be 4 bits.

In this embodiment, the data is outputted synchronized with the image transfer signal from the image information precision converter 5 to the interface section 8 through data lines DATA 7 to DATA 0. In the processing of STEP S3, when the cycle of the frame transfer demand signal is 250 ms as shown in FIG. 4(A), the precision information directing that the quantization precision is set to 8 bits is outputted. Thereupon, as shown in FIG. 5, the conversion image information of respective pixels are transferred from the image information precision converter 5 to the interface section 8 using 8 bits of DATA 7 to DATA 0. Namely, the data of 1 (one) pixel is transferred to the interface section 8 in accordance with one pixel transfer signal. Further, in FIG. 5, P1 to P8 denote the data of 1 (one) pixel respectively.

When the cycle of the frame transfer demand signal is 333 ms as shown in FIG. 4(B), in the processing of STEP S5, the precision information directing that the quantization precision is set to 6 bits is outputted. Thereupon, as shown in FIG. 6, the conversion image information of respective pixels are transferred from the image information precision converter 5 to the interface section 8 using 6 bits out of 8 bits of DATA 7 to DATA 0. Namely, the data of (4/3) pixel is transferred to the interface section 8 in accordance with 1 (one) pixel transfer signal. Further in FIG. 6, Pna, Pnb, Pnc (n=1 to 8) denote the data of 2 bits out of 6 bits which constitute 1 (one) pixel.

When the cycle of the frame transfer demand signal is 500 ms as shown in FIG. 4(C), in the processing of STEP S6, the precision information directing that the quantization precision is set to 4 bits is outputted. Thereupon, as shown in FIG. 7, the conversion image information of respective pixels are transferred from the image information precision converter 5 to the interface section 8 using 4 bits of DATA 7 to DATA 4 or DATA 3 to DATA 0. Namely, the data of 2 (two) pixels are transferred to the interface section 8 in accordance with one pixel transfer signal. Further, in FIG. 7, P1 to P8 denote the data of 4 bits which constitutes 1 (one) pixel respectively.

As described above, when an output cycle of the frame transfer demand signal from the personal computer becomes long so that the cycle of the image transfer signal outputted from the personal computer becomes long, the quantization precision of the pixel data deteriorates in accordance therewith. As a result, a change of frame rate of the image data which is transferred from the image processing apparatus to the personal computer becomes small.

As shown in FIGS. 5 and 6, when the cycle of the pixel transfer signal changes from T into (4/3) T, the quantization precision is altered as being (6/8)=(3/4). Further, as shown in FIGS. 5 and 7, when the cycle of the pixel transfer signal changes from T to 2T, the quantization precision is altered into as being (4/8)=(1/2). As a result, the cycle of the pixel transfer signal is in all cases of T, (4/3)T, or 2T, the pixel number outputted within prescribed time period becomes identical. Namely, the frame rate is identical with one another.

Figure 3:
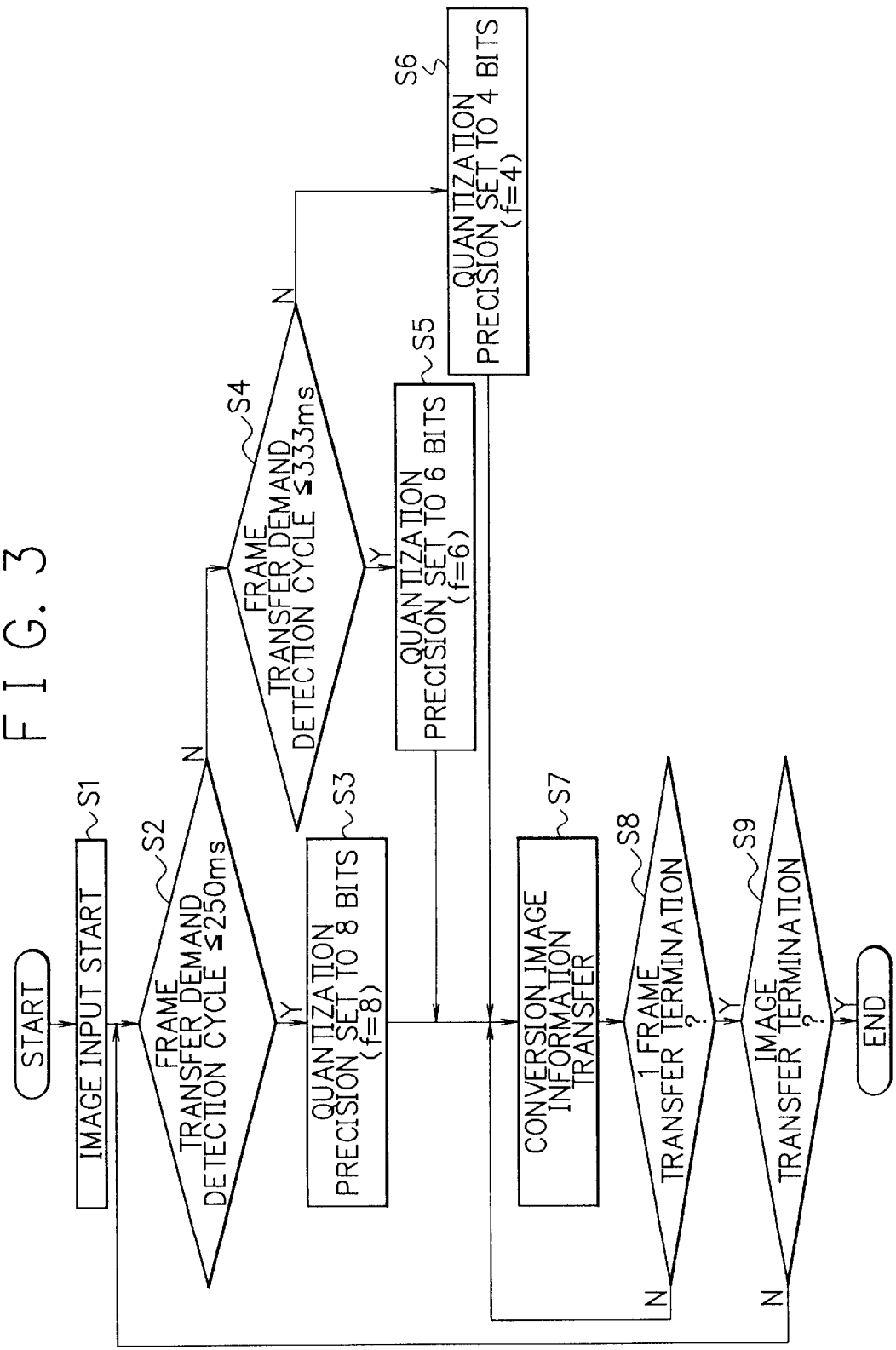
FIG. 3 is a flowchart showing operation of the image processing apparatus shown in FIG. 2.

In the processing shown in the flowchart of FIG. 3,
1. a case as being the cycle of the frame transfer demand signal=less than 250 ms;
2. a case as being the cycle of the frame transfer demand signal=exceeding 250 ms and less than 333 ms;
3. a case as being the cycle of the frame transfer demand signal=exceeding 333 ms;
   in each above separated case, the process causes the bit number of 1 (one) pixel data to be changed into as being 8, 6, 4. Consequently, the frame rate is not necessarily to become constant in the strict sense of the word, however, the frame rate is within prescribed limit. Hence, in the conventional transfer method, there was the possibility that error such as frame omission and so forth occur since the frame rate changes largely in accordance with processing condition of the personal computer, in opposite thereto, in this embodiment, such the error is eliminated.

Furthermore, the reference values of the cycle of the frame transfer demand signals 250 ms, and 333 ms and the bit number of 1 (one) pixel data 8, 6, 4 as shown in this embodiment are appropriate examples in accordance with performance of general image processing apparatus and/or the personal computer, however, appropriate voluntary value is capable of being set in every respective cases in accordance with performance of the personal computer 10 and/or the image processing apparatus, and equipment connection condition and so forth in the system.

Moreover, in this embodiment, since it becomes possible that both of the reference value of the cycle of the frame transfer demand signal to be reference of the quantization precision conversion and the bit number of 1 (one) pixel data after quantization precision conversion are changed, it is capable of being set those values to the appropriate value in accordance with the performance and so forth of the system to be used.

In the above described first embodiment, the process causes the change of the frame rate of the image data to be small, which image data is transferred from the image processing apparatus to the personal computer while controlling the quantization precision of the pixel data, however, it is suitable to cause data quantity to change transferred to the personal computer due to another method. For instance, a process causes image data within 1 (one) line to be thinned-out and implementing thinning-out in every line unit.

Figure 8:
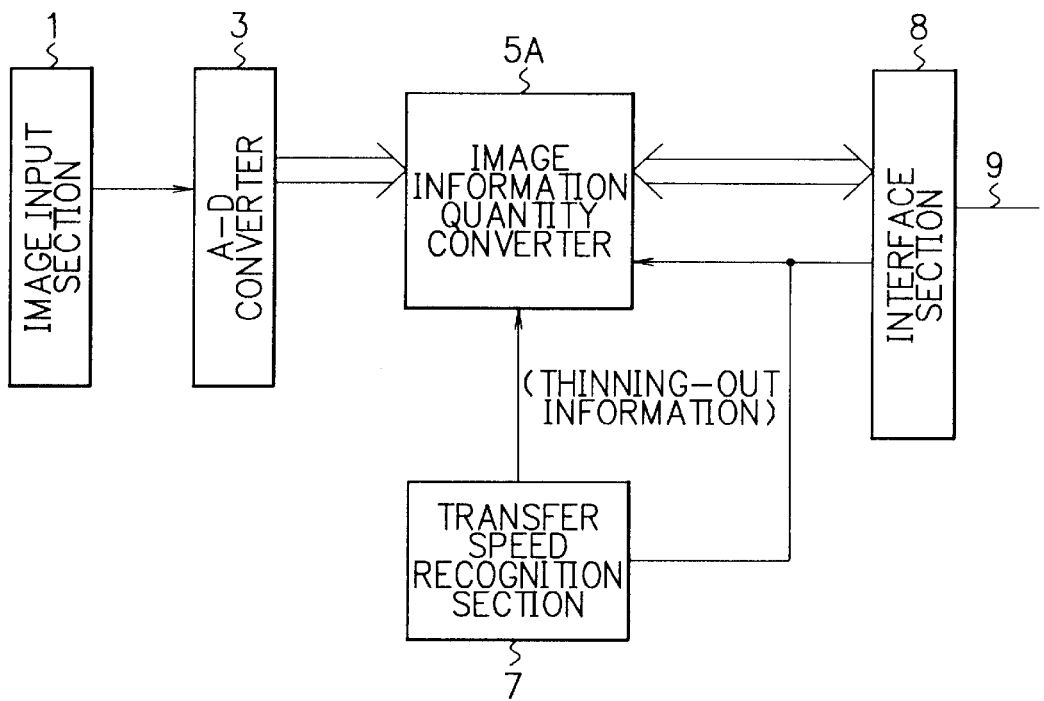
FIG. 8 is a block diagram showing a configuration of a second embodiment of the image processing apparatus according to the present invention.

FIG. 8 is a block diagram showing a second embodiment which implements such transfer data quantity control. In FIG. 8, an image information quantity converter (transfer data quantity converter, information quantity converter) 5A implements a thinning-out of pixel and/a thinning-out of line in accordance with a transfer speed information (thinning-out information) from the transfer speed recognition section 7. Namely, the image information quantity converter 5A implements conversion of the data quantity. Further, another constitution elements are identical with the constitution elements shown in FIG. 2.

In this embodiment, the transfer speed recognition section 7 counts the cycle of the frame transfer demand signal transmitted from the personal computer through the USB 9, before recognizing practical transfer speed of the digital image data in the USB 9, thus outputting a thinning-out information in accordance with recognized transfer speed to the image information quantity converter 5A.

Figure 9:
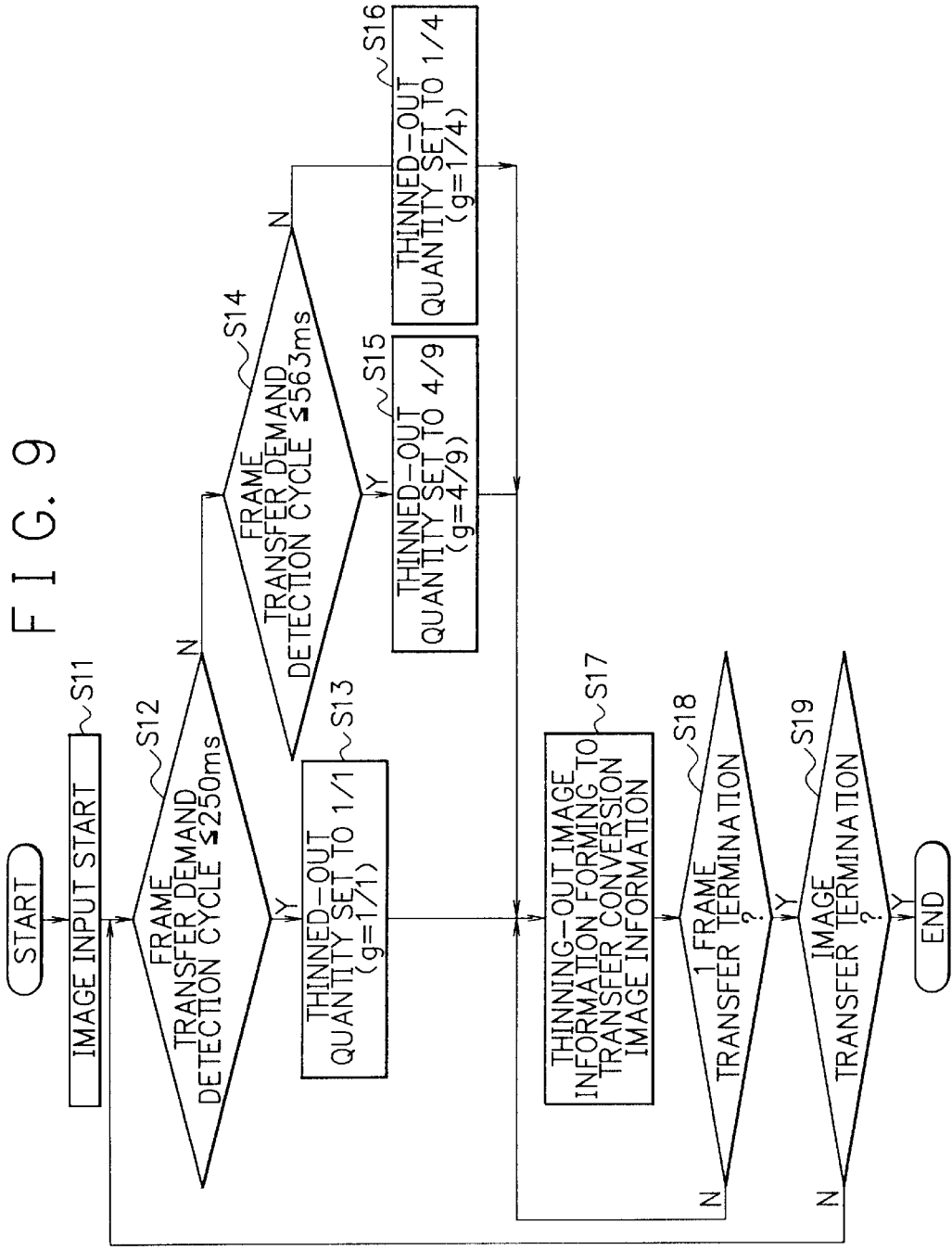
FIG. 9 is a flow chart showing operation of the image processing apparatus shown in FIG. 8.

Next, operation will be described referring to the flowchart of FIG. 9.

When the image processing apparatus starts, the image input section 1 commences photographing of a subject (STEP S11). An analog image data from the image input section 1 undergoes a sampling with prescribed sampling rate at A-D converter 3 to be converted into digital image data of 1 (one) pixel of 8 bits. Then the digital image data is inputted successively to the image information quantity converter 5A.

The personal computer outputs the frame transfer demand signal requiring a frame data output from the image processing apparatus to the USB 9 intermittently. The cycle of the frame transfer demand signal is an interval of demand signal of the image data from the personal computer. When the other equipments except for the image processing apparatus do not operate, an output interval of the frame transfer demand signal is short, because the USB can be occupied for transferring the image data from the image processing apparatus and the personal computer does not implement another processing except for the image processing. To the contrary, when also the other equipments are operating, the output interval of the frame transfer demand signal is long, because the personal computer should take in data from the other equipments through the USB 9 to process the data.

The transfer speed recognition section 7, when the frame transfer demand signal is outputted from the personal computer, counting difference between a time on that occasion and a time when the frame transfer demand signal is outputted directly before it, counts the cycle of the frame transfer demand signal. The transfer speed recognition section 7 recognizes a transfer speed of the image data from the counting result. Then the transfer speed recognition section 7 provides a thinning-out information in accordance with the recognized transfer speed for the image information quantity converter 5A. The short cycle of the frame transfer demand signal is to mean that transfer processing of the image data of previous frame ends early, therefore, in this embodiment, data quantity within the frame is set comparatively large. On the other hand, the long cycle of the frame transfer demand signal is to mean that transfer processing of the image data of previous frame takes a lot of time, therefore, the data quantity within the frame is set comparatively small. Even though the practical data transfer speed is low, the frame rate do not become low by setting the data quantity within the frame comparatively small. Further, in this embodiment, decrease of data quantity within the frame is realized due to the thinning-out of the pixel and/or the thinning-out of the line.

In this embodiment, the cycles 250 ms and 563 ms of the frame transfer demand signal are used as reference value for altering a thinning-out information in accordance with the cycle of the frame transfer demand signal namely the data transfer speed. Namely, when the cycle of the frame transfer demand signal is less than 250 ms (STEP S12), the transfer speed recognition section 7 provides a thinning-out information directing of no thinning-out to the image information quantity converter 5A (STEP S13).

In cases where the cycle of the frame transfer demand signal exceeds 250 ms, when the cycle of the frame transfer demand signal is less than 563 ms (STEP S14), the transfer speed recognition section 7 provides the thinning-out information for directing that it renders a thinned-out quantity "g" to be 4/9 (STEP S15). Here, the thinned-out quantity "g" means data quantity after thinning-out processing to the input data quantity.

When the cycle of the frame transfer demand signal exceeds 563 ms, the transfer speed recognition section 7 provides the thinning-out information for directing that it renders the thinned-out quantity "g" to be 1/4 for the image information quantity converter 5A (STEP S16).

The image information quantity converter 5A converts data quantity of the image data of newly inputted frame into data quantity in accordance with the thinning-out information to output to the interface section 8 (STEP S17). Hereinafter, the image data outputted to the interface section 8 is called as a conversion image information.

Concretely, the image information quantity converter 5A thins-out the image data of respective lines of the inputted frame such that the image data becomes the quantity which is denoted by a value of square root of thinned-out quantity "g". For instance, if the thinned-out quantity "g" is 4/9, the image information quantity converter 5A thins-out such that the data quantity becomes 2/3, concretely, thinning-out 1 (one) pixel in every 3 (three) pixels. If the thinned-out quantity "g" is 1/4, the image information quantity converter 5A thins-out such that the data quantity becomes 1/2, concretely, thinning-out 1 (one) pixel in every 2 (two) pixels.

The image information quantity converter 5A thins-out the input image data such that the data quantity in the perpendicular direction after the thinning-out processing becomes quantity which is denoted by a value of square root of thinned-out quantity "g". For instance, if the thinned-out quantity "g" is 4/9, the image information quantity converter 5A thins-out 1 (one) line in every 3 (three) lines, further, if the thinned-out quantity "g" is 1/4, the image information quantity converter thins-out 1 (one) line in every 2 (two) lines.

Consequently, if the thinned-out quantity "g" is 4/9, the pixel is thinned-out such that the data quantity becomes 2/3 in the line direction (horizontal direction), and such that the data quantity becomes 2/3 in the perpendicular direction, ultimately, the data quantity after thinning-out becomes 4/9. Further, if the thinned-out quantity "g" is 1/4, the pixel is thinned-out such that the data quantity becomes 1/2 in the line direction (horizontal direction), and such that data quantity becomes 1/2 in the perpendicular direction, ultimately, the data quantity after thinning-out becomes 1/4.

Subsequently, the processing of STEP S17 is repeated until the time when the transfer of the image data of 1 (one) frame is terminated (STEP S18). When the transfer of the image data of 1 (one) frame is terminated, if the image information transfer is not terminated, the processing after STEP S12 in connection with next frame is implemented again (STEP S19). Furthermore, termination of the image information transfer, for instance, depends on transmission of the termination signal from the personal computer.

Next, operation example will be described referring to timing chart of FIGS. 10(A) to 10(C), to FIGS. 11 to 13.

Figure 10:
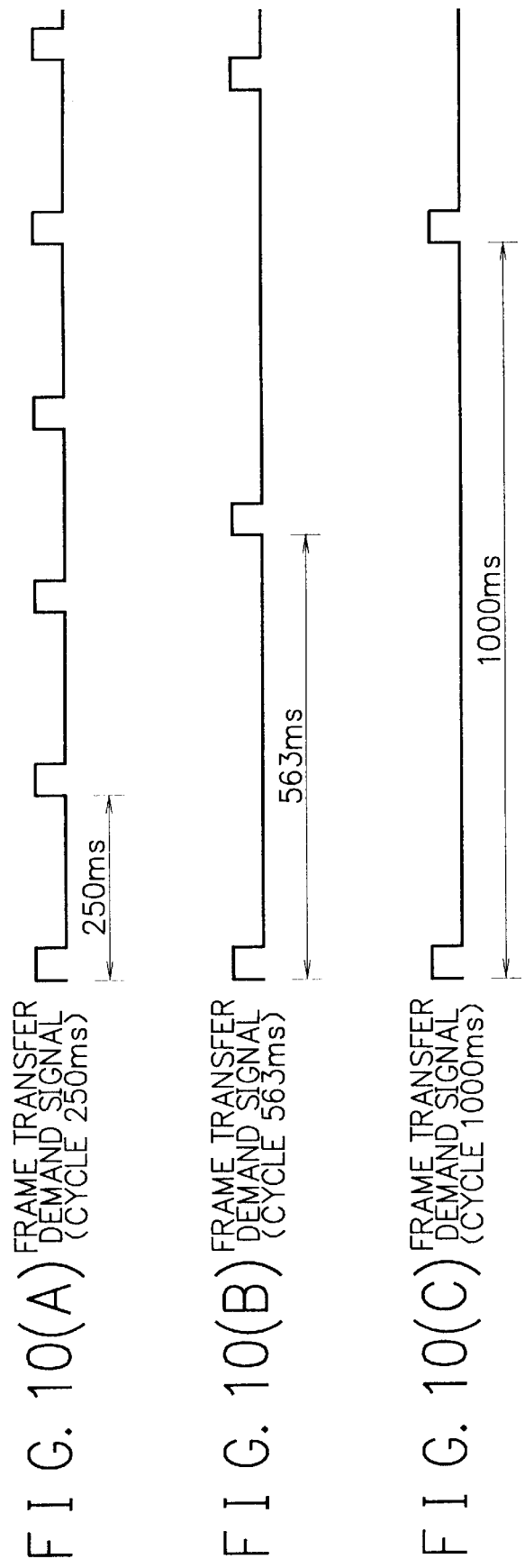
FIGS. 10(A) to 10(C) are timing chart showing example of cycle of a frame transfer demand signal.
Figure 11:
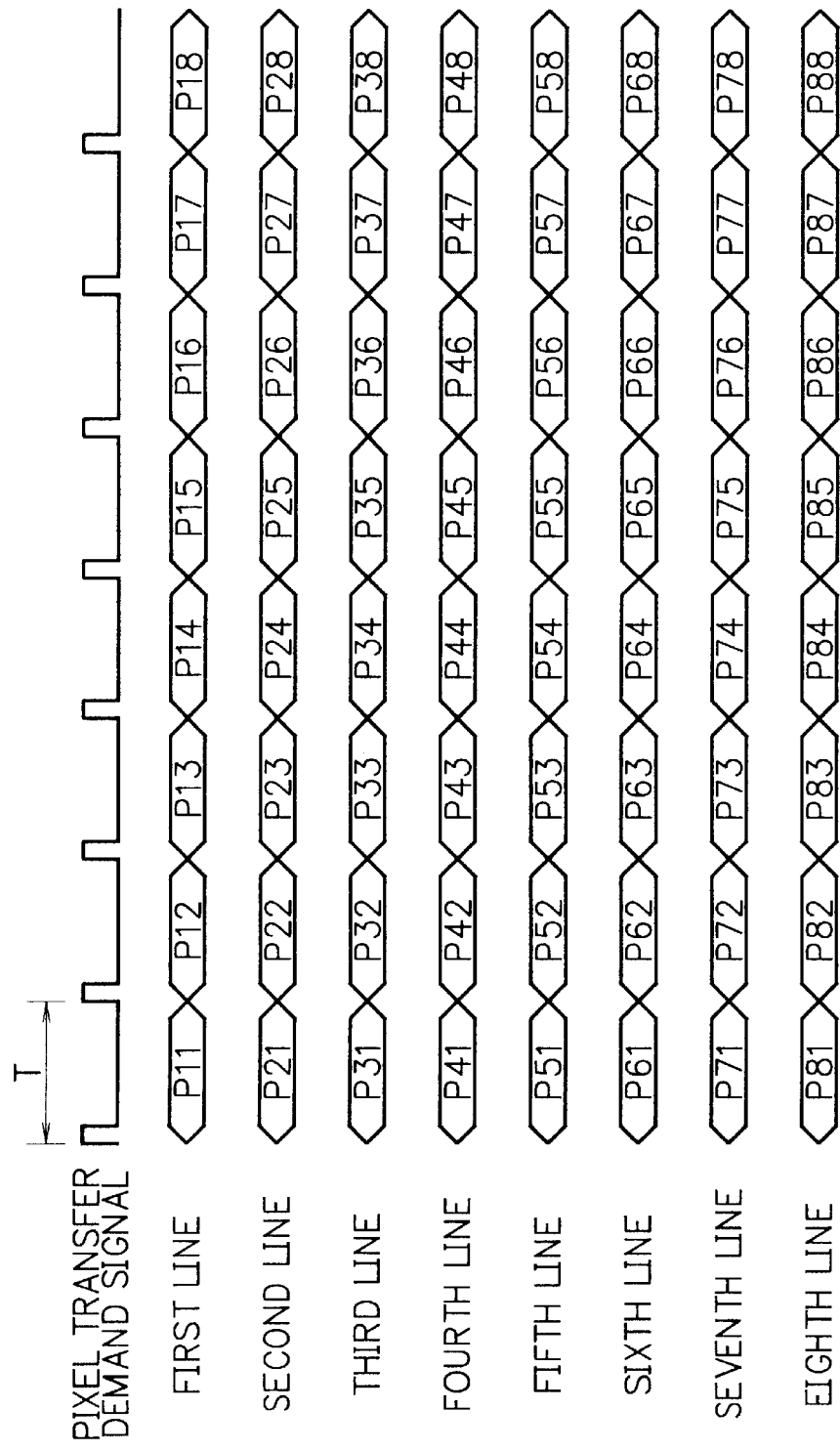
FIG. 11 is a timing chart showing condition of output of conversion image information in the case where thinned-out information directing that thinned-out quantity is to be as being "g"=1/1.
Figure 12:
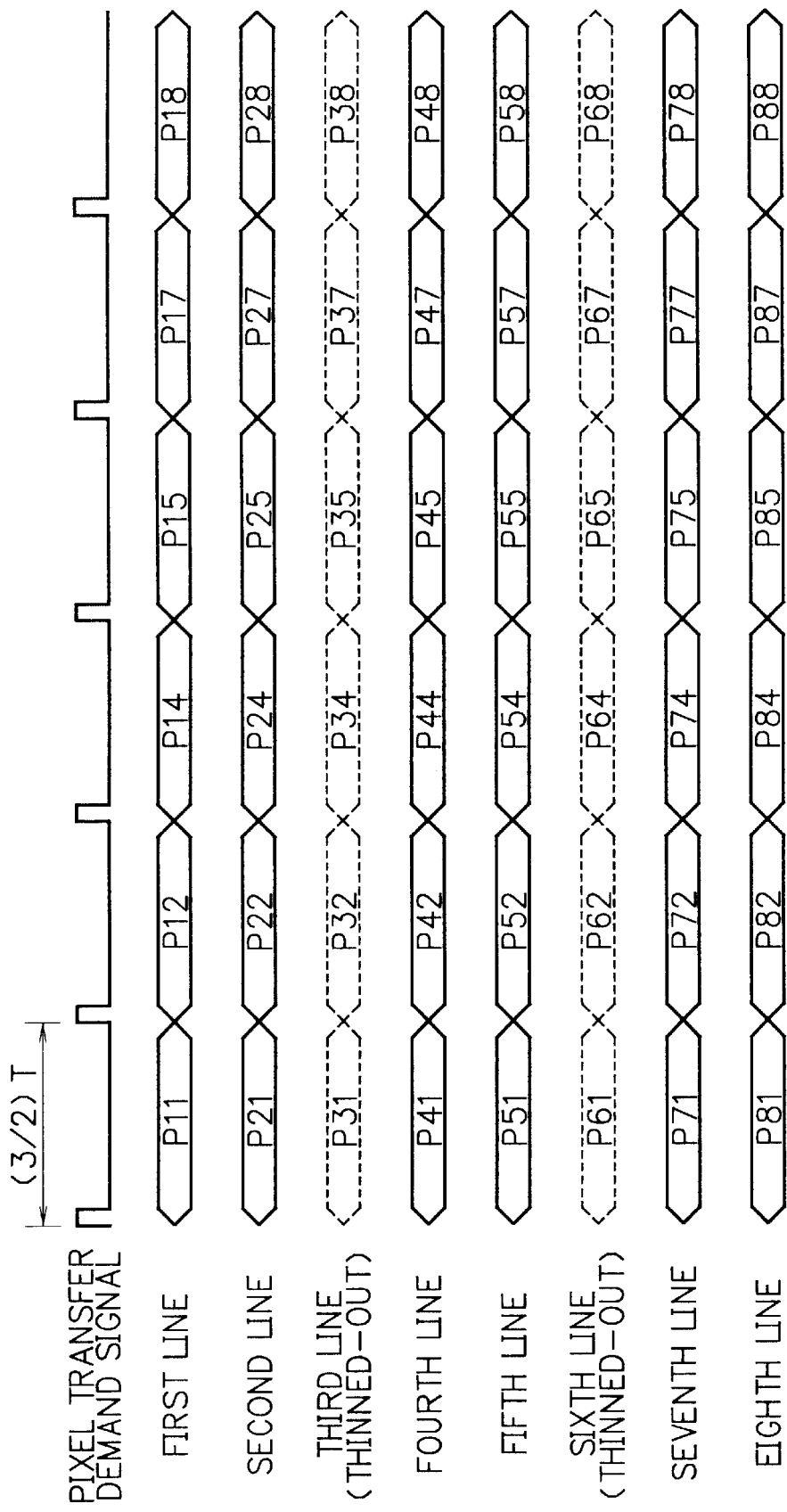
FIG. 12 is a timing chart showing condition of output of conversion image information in the case where thinned-out information directing that thinned-out quantity is to be as being "g"=4/9.
Figure 13:
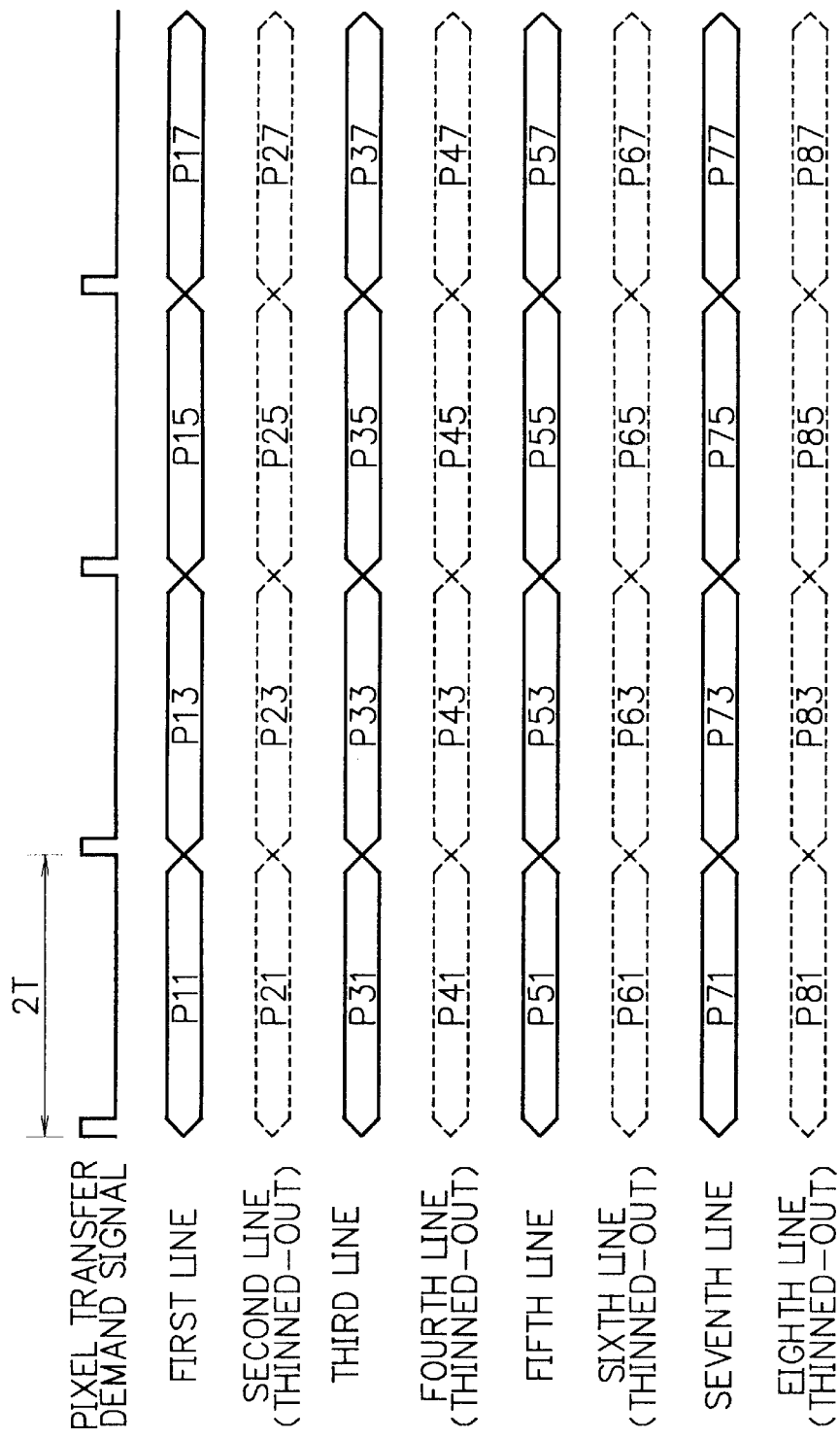
FIG. 13 is a timing chart showing condition of output of conversion image information in the case where thinned-out information directing that thinned-out quantity is to be as being "g"=1/4.

FIGS. 10(A) to 10(C) show the cycle of the frame transfer demand signal. FIG. 10(A) shows example of cycle of 250 ms. FIG. 10(B) shows example of cycle of 563 ms. FIG. 10(C) shows example of cycle of 1000 ms. FIG. 11 is a timing chart showing condition of output of the conversion image information in case where the thinning-out information is outputted for directing that the thinning-out is not implemented. Further, FIG. 12 is a timing chart showing condition of output of conversion image information in the case where thinned-out information for directing the thinned-out quantity "g"=4/9 is outputted. FIG. 13 is a timing chart showing condition of output of conversion image information in the case where thinned-out information for directing thinned-out quantity "g"=1/4 is outputted.

In this embodiment, the data is outputted from the image information converter 5A to the interface section 8 using 8 bits of the data lines DATA 7 to DATA 0 synchronized with the pixel transfer signal. When the cycle of the frame transfer demand signal is 250 ms as shown in FIG. 10(A), in the processing of STEP S13, the thinning-out information for directing that the thinning-out is not implemented is outputted. Thereupon, as shown in FIG. 11, the conversion image information of respective pixels are transferred from the image information quantity converter 5A to the interface section using 8 bits of DATA 7 to DATA 0. Namely, the data of 1 (one) pixel is transferred to the interface section 8 in accordance with 1 (one) pixel transfer signal. Further, in FIG. 11, P11 to P88 denote the data of 1 (one) pixel respectively.

When the cycle of the frame transfer demand signal is 563 ms as shown in FIG. 10(B), in the processing of STEP S15, the thinning-out information for directing that the thinned-out quantity "g" is 4/9 is outputted. Thereupon, as shown in FIG. 12, in the pixel of respective lines, 1 (one) pixel is thinned-out in every 3 (three) pixels, and 1 (one) line is thinned-out in every 3 (three) lines.

When the cycle of the frame transfer demand signal is 1000 ms as shown in FIG. 10(C), in the processing of STEP S16, the thinning-out information that the thinned-out quantity "g" is 1/4 is outputted. Thereupon, as shown in FIG. 13, in the pixel of respective lines, 1 (one) pixel is thinned-out in every 2 (two) pixels, and 1 (one) line is thinned-out in every 2 (two) lines.

As described above, when the output cycle of the frame transfer demand signal from the personal computer becomes long so that the cycle of the pixel transfer signal outputted from the personal computer becomes long, thus the pixel number within 1 (one) frame is decreased in accordance therewith. As a result, a change of the frame rate of the image data transferred from the image processing apparatus to the personal computer becomes small.

As shown in FIG. 12, when the cycle of the pixel transfer signal changes from T into (3/2) T, the transfer data quantity of 1 (one) line is reduced into (2/3). Namely, the conversion image information is transferred to the interface section 8 so as to be synchronized with the pixel transfer signal of cycle ((3/2) T). Further, as shown in FIG. 13, when the cycle of the pixel transfer signal changes from T into 2T, the transfer data quantity of 1 (one) line is reduced to (1/2). Namely, the conversion image information is transferred to the interface section 8 so as to be synchronized with the pixel transfer signal of cycle 2T. As a result, even though the cycle of the pixel transfer signal is any of T, (3/2)T, and 2T, the pixel number outputted within the prescribed time period becomes identical. Namely, the frame rate is identical.

Figure 14:
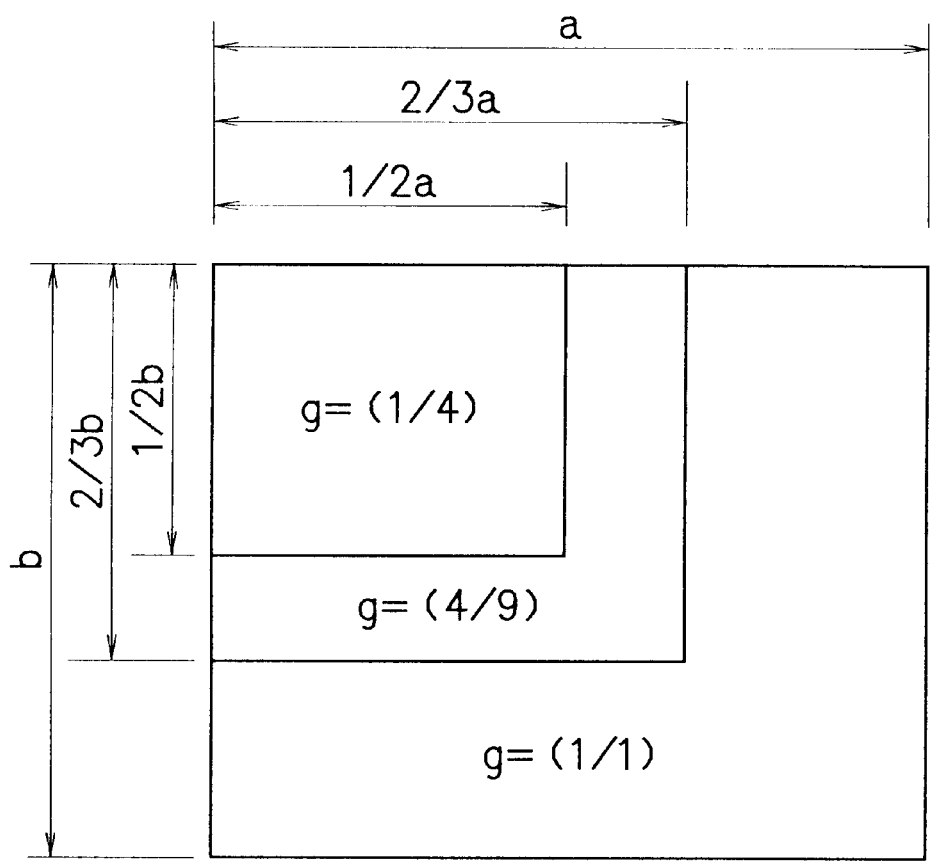
FIG. 14 is an explanation view showing conversion image information in horizontal direction and in vertical direction.

As shown in FIG. 14, the thinning-out with the same quantity is implemented in the horizontal direction and the perpendicular direction, therefore, the image is not distorted at the side of the personal computer. Further, in FIG. 14, "a" denotes the pixel number in the horizontal direction, and "b" denotes line number.

In the processing shown in the flowchart of FIGS. 9(A), 9(B), 9(C):
1. a case as being the cycle of the frame transfer demand signal=less than 250 ms;
2. a case as being the cycle of the frame transfer demand signal=exceeding 250 ms and less than 563 ms;
3. a case as being the cycle of the frame transfer demand signal=exceeding 563 ms; in each above separated case, the process changes the thinned-out quantity "g" into as being (1/1), (4/9), (1/4). Consequently, the frame rate is not always to become constant in the strict sense of the word, however, the frame rate is within prescribed limit. Hence, in the conventional transfer method, there was the possibility that error such as frame omission and so forth occur since the frame rate changes largely in accordance with processing condition of the personal computer, to the contrary, in this embodiment, such the error is eliminated.

Furthermore, the reference values of the cycle of the frame transfer demand signals 250 ms, and 563 ms and the thinned-out quantity "g"=(1/1), (4/9), (1/4) as shown in this embodiment are appropriate examples in accordance with performance of general image processing apparatus and/or the personal computer, however, appropriate voluntary value is capable of being set in every respective cases in accordance with performance of the personal computer 10 and/or the image processing apparatus, and equipment connection condition and so forth in the system.

Furthermore, in this embodiment, the USB 9 is used as the interface for connecting the personal computer and the image processing apparatus. If a plurality of equipments including an image processing apparatus are capable of connecting on the interface in which the host apparatus takes in the data from respective equipments using time division, the present invention is capable of being applied in the case where the interface is used except for the USB 9.

As described above, according to the present invention, the image processing apparatus enables the transfer speed of the image signal outputted to external part to be detected. The image processing apparatus converts the transfer data quantity of the image signal in accordance with the transfer speed detected to output to the external part. Therefore, the image processing apparatus enables the image data to be transferred with stable frame rate, thus occurring no frame omission of the moving image, even though the image processing apparatus causes another equipments on the interface bus to operate synchronously.

While preferred embodiments of the invention have been described using specific terms, the description has been for illustrative purpose only, and it is to be understood that changes and variations may be made without departing from the spirit or scope of the following claims.

What is claimed is:
1. An image processing apparatus comprising:
   converting means for reading an image of a subject to convert said image into an electric signal before outputting said image;
   quantizing means for outputting a quantized electric signal as an image signal while quantizing said electric signal output from said converting means;
   frame transfer speed recognition means for detecting a frame transfer speed of said image signal output to an external part;
   frame transfer data quantity converting means for converting a data quantity of the quantized image signal from said quantizing means in accordance with the frame transfer speed detected by said frame transfer speed recognition means; and
   interface means for outputting the image signal output from said frame transfer data quantity converting means at a stable frame rate.

2. An image processing apparatus as claimed in claim 1, wherein said frame transfer speed recognition means detects the frame transfer speed of the image signal according to a cycle of a frame transfer demand signal transmitted from a host apparatus which receives the image signal.

3. The image processing apparatus of claim 2, wherein said frame transfer data quantity converting means comprises a quantization precision converting means for converting quantization precision of the quantized image signal from the quantization means, and said quantization precision conversion means, increases quantization precision when said frame transfer speed recognition means detects that the cycle of the frame transfer demand signal is less than a reference value, and decreases the quantization precision when said frame transfer speed recognition means detects that the cycle of the frame transfer demand signal exceeds the reference value.

4. The image processing apparatus of claim 3, wherein said quantization precision converting means outputs a directly quantized image signal to said interface means in the case where the cycle of the frame transfer demand signal is less than a minimum reference value of a plurality of reference values, and the quantization precision converting means reduces a bit number of the quantized image signal in accordance with another reference value to output to said interface means when the cycle of the frame transfer demand signal exceeds said minimum reference value and the cycle is less than said another reference value.

5. The image processing apparatus of claim 4, wherein said quantization precision conversion means enables the bit number of the image signal, which is changed in accordance with respective reference values, to be altered.

6. An image processing apparatus of claim 2, wherein said frame transfer data quantity conversion means comprises an information quantity conversion means for converting information quantity of the quantized image signal from said quantization means, and said information quantity conversion means increases information quantity, when the frame transfer speed recognition means detects that the cycle of the frame transfer demand signal is less than the reference value, and said information quantity conversion means decreases information quantity when the frame transfer speed recognition means detects that the cycle of the frame transfer demand signal exceeds the reference value.

7. The image processing apparatus of claim 6, wherein said information quantity conversion means outputs directly a quantized image signal to the interface means in the case where the cycle of the frame transfer demand signal is less than a minimum reference value of a plurality of reference values, and said information conversion means reduces the information quantity of the image signal in accordance with another reference value to output to said interface means when the cycle of the frame transfer demand signal exceeds said minimum reference value and the cycle is less than said another reference value.

8. The image processing apparatus of claim 6, wherein said information quantity conversion means is capable of changing the information quantity of the image signal in accordance with respective reference values.

9. The image processing apparatus of claim 7, wherein said information quantity conversion means is capable of changing the information quantity of the image signal in accordance with respective reference values.

10. The image processing apparatus of claim 3, wherein said frame transfer speed recognition means is capable of changing said reference value.

11. The image processing apparatus of claim 4, wherein said frame transfer speed recognition means is capable of changing said reference value.

12. The image processing apparatus of claim 6, wherein said frame transfer speed recognition means is capable of changing said reference value.

13. The image processing apparatus of claim 7, wherein said frame transfer speed recognition means is capable of changing said reference value.

14. The image processing apparatus of claim 1, wherein said interface means is connected to universal serial bus.

15. The image processing apparatus of claim 2, wherein said interface means is connected to universal serial bus.

16. The image processing apparatus of claim 3, wherein said interface means is connected to universal serial bus.

17. An The image processing apparatus of claim 4, wherein said interface means is connected to universal serial bus.

18. The image processing apparatus of claim 5, wherein said interface means is connected to universal serial bus.

19. The image processing apparatus of claim 6, wherein said interface means is connected to universal serial bus.

20. The image processing apparatus of claim 7, wherein said interface means is connected to universal serial bus.

21. The image processing apparatus of claim 8, wherein said interface means is connected to universal serial bus.

22. The image processing apparatus of claim 10, wherein said interface means is connected to universal serial bus.

23. An image processor comprising:
   a converter that reads an image and converts that image into an image signal;
   a quantizer that quantizes said image signal;
   a frame transfer speed detector that detects a frame transfer speed of an output image signal based upon a cycle of a frame transfer demand signal; and
   a transfer data quantity converter that converts the quantity of data in said quantized image signal based upon the detected frame transfer speed.

24. An image processor comprising:
   a converter that reads an image and converts that image into an image signal;
   a quantizer that quantizes said image signal;
   a frame transfer speed detector that detects a frame transfer speed of an output image signal;
   a transfer data quantity converter that converts the quantity of data in said quantized image signal based upon the detected frame transfer speed; and
   a universal serial bus interface which outputs said converted and quantized image signal as said output image signal at a stable frame rate.

25. An image processor comprising:
   a converter that reads an image and converts that image into an image signal;
   a quantizer that quantizes said image signal;
   a frame transfer speed detector that detects a frame transfer speed of an output image signal; and
   a transfer data quantity converter that converts the quantity of data in said quantized image signal based upon the detected frame transfer speed.

26. An image processor comprising:
   a converter that reads an image and converts that image into an image signal;
   a quantizer that quantizes said image signal;
   a frame transfer speed detector that detects the frequency of a frame transfer demand signal; and
   a transfer data quantity converter that converts the quantity of data in said quantized image signal based upon the detected frequency of said frame transfer demand signal.

\* \* \* \* \*